UNITED STATES PATENT OFFICE.

CHARLES L. HUSSEY, OF SACRAMENTO, CALIFORNIA.

REMEDY FOR BLACKLEG.

SPECIFICATION forming part of Letters Patent No. 332,804, dated December 22, 1885.

Application filed October 15, 1885. Serial No. 180,016. (No specimens.)

*To all whom it may concern:*

Be it known that I, CHARLES L. HUSSEY, of the city and county of Sacramento, and State of California, have invented a new and useful Remedy for Blackleg, of which the following is a description.

My invention relates to the class of medical compounds, and especially to a composition of matter the object of which is to prevent that disease of cattle known as "blackleg."

My composition of matter consists of the following ingredients, in the proportions substantially as specified: Cider-vinegar, one pint; molasses, one pint; salt, one pint; asafetida, one ounce; spirits of turpentine, one-half pint; alcohol, one pint; tincture of iron, one ounce; sulphuric acid, (chemically pure,) four ounces.

The manner of mixing these various ingredients is as follows: The cider-vinegar, the molasses, the salt, and the asafetida are mixed in a glass demijohn and are shaken frequently during a period of about twenty-four hours. The turpentine, alcohol, and tincture of iron are then added, and the whole shaken frequently during a period of about forty-eight hours. Then the chemically-pure sulphuric acid is added, and the mixture is ready for use.

The manner of using the compound is as follows: Make an incision of one to one and a half inch in length in the center of the front of the ankles of the hind feet of the animal, and between the pastern-joint and the split of the hoof. This will expose the small artery which lies just under the skin. This artery is then caught up on the point of a knife-blade and is completely severed. Ten drops of the compound are then injected into the incision.

Having thus described my invention, what I claim as new, and desire to secure by Letters Patent, is—

A composition of matter to be used as a remedy for blackleg in cattle, consisting of cider-vinegar, molasses, salt, asafetida, spirits of turpentine, alcohol, tincture of iron, and sulphuric acid, united in the proportions substantially as specified.

In witness whereof I have hereunto set my hand.

CHARLES L. HUSSEY.

Witnesses:
C. F. THOMAS,
W. D. HOLMES.